July 23, 1963
A. R. COX
3,098,779
METHOD OF MAKING A PLASTIC VALVE AND ATTACHING
SAME TO A HOLLOW INFLATABLE ARTICLE
Filed April 13, 1961
FIG. 1
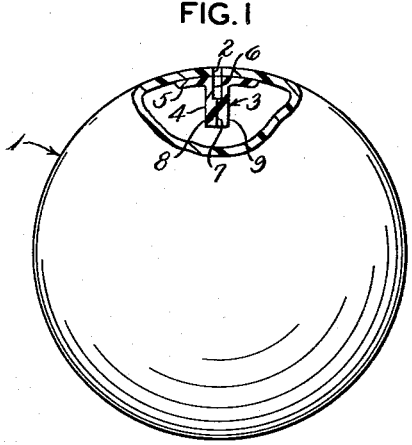
FIG. 2
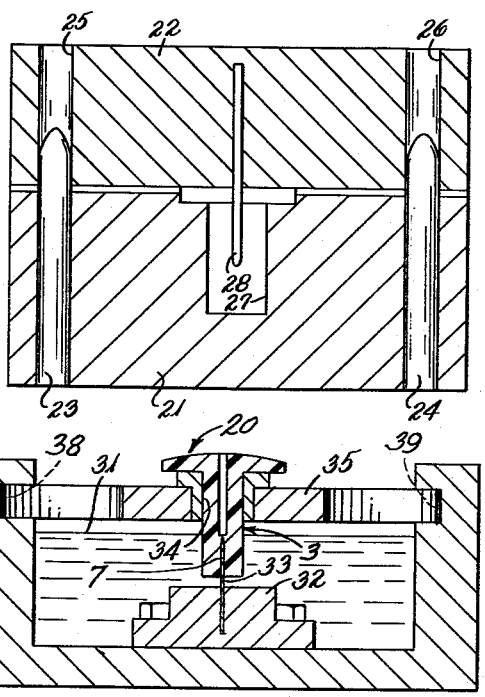
FIG. 5
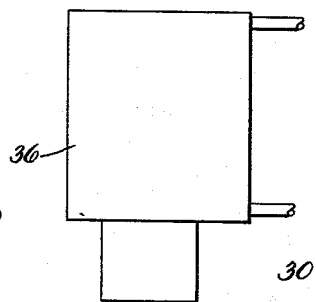
FIG. 4
FIG. 3
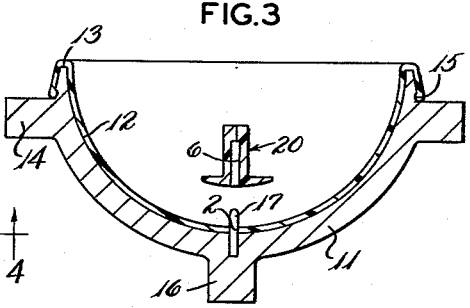
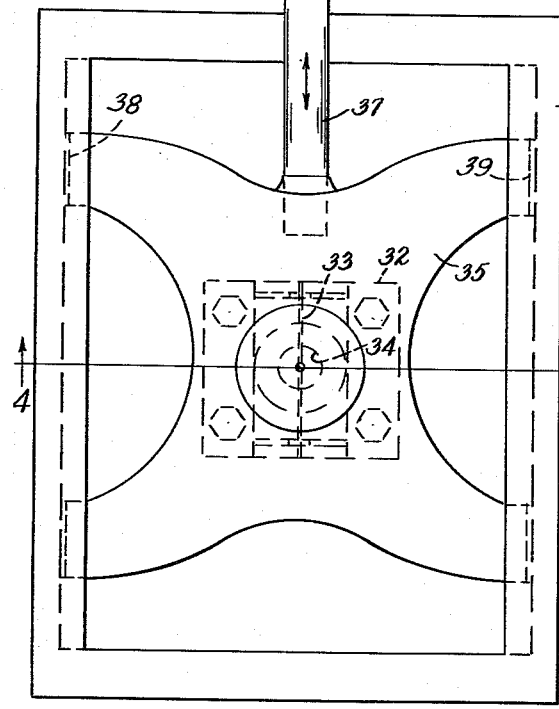
INVENTOR.
ALVON R. COX
BY Oldham & Oldham
ATTYS.

3,098,779
Patented July 23, 1963

3,098,779
METHOD OF MAKING A PLASTIC VALVE AND ATTACHING SAME TO A HOLLOW INFLATABLE ARTICLE
Alvon R. Cox, Ashland, Ohio, assignor to The Faultless Rubber Company, Ashland, Ohio, a corporation of Ohio
Filed Apr. 13, 1961, Ser. No. 102,841
7 Claims. (Cl. 156—228)

This invention relates to valves for hollow inflatable articles of elastic material and to methods of making the same, and is especially useful in the manufacture of inflatable one-piece balls of large size, such as basketballs or volleyballs, made from vinyl plastic materials, such as plastisols.

It is an object of the present invention to provide a ball of vinyl plastic material having an inflation aperture with a valve integral with the ball whereby the ball may be inflated and reinflated repeatedly, the valve being within the ball at the aperture.

It is a further object to assemble the valve with a formed hemisphere of the ball prior to assembly of the hemisphere with a similar formed hemisphere before the material of the ball has been fused and then to fuse the assembled article into the final unit.

It is also an object of the invention to provide a novel valve and process of treating the valve so that it will fuse to the rest of the article but split portions in the valve will remain separate during the fusing action.

Further objects are to facilitate manufacture of hollow inflatable articles and to provide a superior article at low cost.

These and other objects will appear from the following description, reference being had to the accompanying drawings forming a part hereof.

Of the drawings:

FIG. 1 is a view of a ball having an inflation valve integral therewith corresponding to the invention, part of the ball being broken away and the valve being shown in cross section.

FIG. 2 is a cross sectional view of a mold for forming the valve body.

FIG. 3 is a cross sectional view of a hemispherical mold member having a deposit of gelled plastisol over its interior and showing the steps of assembling the preformed and treated valve with the gelled material.

FIG. 4 is a vertical section through apparatus for slitting and coating parts of the valve body.

FIG. 5 is a plan of the apparatus of FIG. 4.

In general, the invention relates to a method of making a valve for a hollow inflatable article, such as a ball, made of thermoplastic material which comprises forming a valve with a base flange and a cylindrical body by deposit from vinyl plastisol, said valve having an axially extending bore extending into said cylindrical body through said base flange and with the material forming said valve being only partially fused, slitting the closed end of the cylindrical body to form abutting sealing lips therein communicating with said bore, coating said sealing lips with a silicone oil, and fusing said base flange to the inner surface of an inflatable article without fusing said sealing lips together.

Referring to the drawings and first to FIG. 1, the numeral 1 designates a hollow ball, preferably made from a suitable resilient thermoplastic material, such as vinyl resin plastisol, having a small aperture 2 through its wall, and the numeral 3 designates a valve mounted on the inner surface of the ball and integrally secured thereto over the aperture 2. The valve comprises a cylindrical or elongate body 4 extending radially of the ball and terminating in an outwardly directed flange 5 adjacent to and fused to the inner wall surface of the ball. The cylindrical body is formed with an axial passage 6 at its flanged end in alignment with the aperture 2 and terminating at a position spaced short of its radially innermost end, the remaining portion of the cylindrical body being split by a knife cut, or razor blade slit 7 diametrical of its axis to provide a pair of contiguous valve lips 8 and 9. The construction is such that the lips 8 and 9 are normally in contact and are held together by a superior pressure within the ball but air may be forced into the ball through the aperture 2 either by blowing through the aperture 2 or by an air nozzle or tube inserted into the passage 6.

In the manufacture of the ball, according to the invention, a pair of hemispherical mold members are usually provided. A typical one of these members is shown in section in FIG. 3 and is designated by the numeral 11. It has a hemispherical mold surface 12 terminating in an annular lip 13 which extends beyond an outwardly directed flange 14 which may act to store heat near the lip and be used to support the mold member. The lip 13 may be undercut on its outer face adjacent the flange 14 as by a circumferential groove 15. The mold may also have an axially extending coaxial hub 16 whereby the mold member may be positioned for rotation about its axis.

The companion mold member is identical with that shown in FIG. 3 except that the mold member of FIG. 3 has an axially extending locating pin 17 mounted therein and projecting into the spherical cavity whereas the companion mold member does not have the pin. The pin, for example, is about 3/64 inch in diameter so that it will snugly engage the axial passage 6 of a valve.

The vinyl resin material for forming the wall of the ball is formed over the spherical surfaces of the mold members by deposit from plastisol in any desired manner such as by slush molding, that is by pouring plastisol to overflowing into the mold, which usually has been preheated, and, after the plastisol has gelled over the mold surface, pouring out the excess material. It is preferred, however, to secure the heated mold on a rotatable spindle, to fill the mold with plastisol and after a period of time sufficient to deposit the desired coating or layer, to spin the excess material out by rotation of the mold, as described more completely in my joint copending application with Albert E. Hosier, Serial No. 37,007, filed June 17, 1960. The deposited material extends over the lip 13 and is anchored by the groove 15.

In case the mold member has a pin 17, a previously molded valve body, or member 20 is then forced over the pin into engagement with the deposited material. If the plastisol has deposited over the pin 17, it may be manually removed, or it can be broken and forced along the pin by forcing the valve member thereon so that an air passage 2 to the valve through the wall is provided. The two mold members are then placed face to face so that the layers of deposited material extending over the mold lips 13 are in contact and clamping pressure is applied to squeeze out some material from between such lips 13. The assembled mold members are then heated to fuse the layers of deposited material and fuse the valve member 20 to the deposited material. The mold is then cooled and the article produced, such as a ball, is removed therefrom.

The valve body 20 may be molded from vinyl resin composition in a mold, such as shown in FIG. 2, wherein two mold plates 21 and 22 are held in alignment by dowel pins 23 and 24 in the plate 21 entering dowel holes 25 and 26 in the plate 22. A cavity 27, having the shape of the valve body, is formed in plate 21 and a mold pin 28 for forming the bore 6 is mounted in alignment therewith in the plate 22 and projects into the cavity.

The member 20 is molded of vinyl plastic which will fuse with the ball material and, as a feature of the invention, has a durometer hardness of about 35 to 45. The material forming the member 20 is preferably not completely fused in its forming mold so as to unite readily with the plastisol deposits in the ball mold.

The ball may be inflated after it is removed from the mold by air or gas introduced through the opening 2. The construction provides economy of mold equipment as the ball may be formed in a mold of relatively small size and then inflated to as much as a 250% increase in circumference, or merely to a desired pressure, with little or no circumferential stretching, as desired.

The plastisols used in forming balls and valves by the invention are of conventional compounding and may be made of any suitable color.

It is a special feature of the present invention that the valve body 20 has been specially processed after its removal from the mold members 21 and 22 and prior to its assembly with the molded ball half 11. Thus FIGS. 4 and 5 show apparatus including a stationary frame 30 which is of generally U-shape in cross section and is adapted to receive a liquid material 31 therein. This liquid material, found to be satisfactory in practice of the invention, is a commercial silicone oil which has a viscosity of preferably approximately 60,000 centipoises but viscosities of from 50,000 to 100,000 centipoises may be used. The frame 30 has a retaining or positioning block 32 secured to the bottom thereof and it suitably positions a member, such a a substantially conventional razor blade 33, in the block 32. The razor blade 33 is of sufficient strength as to retain the position in which it is secured so that the molded valve body or member 20 can be placed in a hole 34 formed in a slide plate 35 that is positioned for short reciprocating movement in a pair of opposed slots 38 and 39 in the upper portion of the block 30. FIG. 4 clearly shows how the blade 33 and the valve member 20 are so related vertically in the apparatus that the lower portion of the cylindrical section 3 of the valve body is adapted to be diametrically slit by the razor blade 33 as the slide plate 35 is moved. A smooth cut of the plastic material, as yet still not completely fused, is obtained as the valve body is moved relative to the razor blade. Such razor blade may have a hole or aperture (not shown) provided therein as this aids in coating the cut surfaces forming the slit 7 in the valve body with the silicone oil present in the chamber formed by the block 30. Initially the valve body 20 is only forced down into engagement with the razor blade 33.

Any suitable means can be used for positioning the slide plate, 35 in the embodiment of the invention shown, to give it forced reciprocation action. Thus a double acting air cylinder 36 is shown connected to the slide plate 35 by a connecting shaft or rod 37 so that after the valve body is positioned in the slide plate, it may then be automatically moved across and back over the surfaces of the razor blade 33. Note that the slit 7 formed by the razor blade, or similar cutter unit, extends from the radially inner end of the valve body to and at least intersects or connects to the passage 6 formed in the valve body. This forms the sealing lips 8 and 9 on the valve body, and these sealing lips are retained in sealing contact with each other by the pressures built up within the ball 1. It will be further understood that the valve body is sufficiently resilient and the vinyl material from which it is made in its final fused form still possesses suitable flexibility or resilience so that the lips 8 and 9 may be separated by an inflating needle or the like for air to be forced into the ball and then the pressure built up in the ball, plus the inherent properties of the valve body 20 and the sealing lips 8 and 9, will retain the valve sealed and all air provided within the ball 1.

It has been a problem in the manufacture of an article, such as the ball 1 of the invention, to prevent the lips 8 and 9 from fusing together during the final fusing action required to secure two ball halves together, and to secure the valve member 3 permanently to the inner surface of the ball 1. By the use of the particular silicone oil of the viscosity indicated, it has been possible to obtain a thin film of this oil over the sealing lips 8 and 9 at the slit 7 and such film of oil, which is of only substantially molecular thickness, very nicely keeps these lips from fusing together during the final fusing action performed on the ball components. The oil does not interfere with the sealing action of the lips 8 and 9. If desired, some holding member or bracket could be swung over to engage the outer surface of the valve member 20 when it is applied to the slide plate 35 to resiliently urge the valve member down against the razor blade for cutting action when the slide plate 35 is moved in one direction. The return stroke of the razor blade or cutter 33 aids in wiping in an oil film onto the slit surfaces. Any excess oil on the cylindrical section 3 of the valve is removed when the valve member is pulled out of the hole 34 in which the section 3 is snugly received.

The valve member 20 is not moved completely past the razor blade 33 in the initial cutting action and the valve member may be manually held against the blade to force it downwardly thereof as the slitting action progresses.

In the ball 1 made in accordance with the practice of the invention, it has been found that any stretching of the wall surfaces of the ball tend to stretch the base flange 5 of the valve body and this seems to aid in setting up forces on the sealing lips 8 and 9 to aid in holding them together for the desired sealing action. Such action plus the inherent strength and characteristics of the material forming the valve body aid in obtaining a continued effective seal on the ball. Furthermore, it will be realized that the valve 3 will effectively permit any desired reinflation of the ball 1 as required.

In view of the foregoing, it is believed that a novel and improved type of a valve has been provided for a ball or other article. This valve can be made relatively inexpensively and is made from substantially conventional materials. The article of the invention is always made in two parts from set or gelled vinyl material so that the partially set valve member 20 can be secured to the inner wall of the article in alignment with an aperture in the wall to be permanently and operatively secured thereto in accord with the teachings of the invention. The novel ball and valve of the invention provide a relatively inexpensive article which will provide a long service life. Thus it is believed that the objects of the invention have been achieved.

This application is a continuation-in-part of my application Serial No. 33,787, filed June 3, 1960.

While certain representative embodiments and details have been shown for the purpose of illustrating the invention, it will be apparent to those skilled in this art that various changes and modifications may be made therein without departing from the scope of the invention as defined by the following claims.

What is claimed is:
1. The method of making a hollow inflatable ball of thermoplastic material which comprises forming a pair of hemispherical walls by deposit from plastisol, forming an aperture through one of said walls, separately forming an inflation valve of only partially fused thermoplastic material having a base attaching flange and having a cylindrical body terminating in a pair of axially extending abutting sealing lips, said valve having a bore extending thereinto from its base end, said lips connecting to said bore and being coated on their adjacent surfaces with a silicone oil having a viscosity of approximately 60,000 centipoises assembling the valve with its bore aligned with said aperture in one of said walls and connected thereto, uniting the hemispherical walls one to another about their margins by pressure applied thereto to form an assembled article, and heat-curing the assembled article to unite the walls and the valve, said silicone oil preventing said lips from fusing together during the heat-curing.

2. The method of making a hollow inflatable ball of thermoplastic material which comprises forming a pair of hemispherical walls by deposit from plastisol and having an aperture extending through one of said walls, separately forming an inflation valve member of only partially fused thermoplastic material having an attaching flange and having a cylindrical body terminating in a pair of axially extending abutting sealing lips, said lips being coated on their adjacent surfaces with a silicone oil having a viscosity of approximately 60,000 centipoises, said valve having a bore extending thereinto through said flange, assembling the valve with its bore aligned with said aperture in one of said walls, uniting the hemispherical walls one to another about their margins to form an assembled article, and heat-curing the assembled article to unite the walls and the valve, said silicone oil preventing said lips from fusing together during the heat-curing.

3. The method of making a valve for a hollow inflatable article which comprises forming a valve with a base flange and a cylindrical body by deposit from vinyl plastisol, partially fusing the vinyl deposit, said valve having an axially extending bore extending into said cylindrical body through said base flange, slitting the closed end of the cylindrical body to form abutting sealing lips therein communicating with said bore, and coating said sealing lips with a silicone oil having a viscosity of between 50,000 and 100,000 centipoises.

4. The method of making a valve for a hollow inflatable article of thermoplastic material which comprises forming a valve with a base flange and a cylindrical body by deposit from vinyl plastisol, partially fusing the vinyl deposit, said valve having an axially extending bore extending into said cylindrical body through said base flange, providing a cutter positioned in a body of silicone oil having a viscosity of between about 50,000 and 100,000 centipoises, forcing the closed end of the cylindrical body against the cutter, and moving the cylindrical body and cutter with relation to each other while pressing the body against the cutter to form a slit in the initially closed end of the cylindrical body and to wipe a film of the oil against the sealing lips formed by cutting the body.

5. The method of making a valve of thermoplastic material and attaching it to a hollow inflatable article of thermoplastic material which comprises forming a valve with a base flange and an elongate cylindrical body by deposit from vinyl plastisol, said valve having an axially extending bore extending into said cylindrical body through said base flange, partially fusing the vinyl plastisol forming said valve, slitting the closed end of the cylindrical body to form abutting sealing lips therein communicating with said bore, coating said sealing lips with a silicone oil having a viscosity of between about 50,000 to 100,000 centipoises, and assembling the valve on the inner wall of a hollow inflatable article by heat, the silicone oil preventing the fusion of said sealing lips.

6. The method of making a valve of plastic material and attaching it to a hollow inflatable article made from the same plastic material which comprises forming a valve with a base flange and a cylindrical body by deposit from partially fused vinyl plastisol, said valve having an axially extending bore extending into said cylindrical body through said base flange a portion of the length of said cylindrical body, diametrically slitting the closed end of said cylindrical body to form abutting sealing lips therein communicating with said bore, coating said sealing lips with a silicone oil having a viscosity of about 60,000 centipoises, assembling the valve on the inner wall of a hollow inflatable article made from partly fused vinyl plastisol, and fusing said base flange to the inner surface of the inflatable article by heat and pressure, said valve having a durometer hardness of between 35 and 45.

7. The method of making a valve of thermoplastic material and attaching it to a hollow inflatable article made of thermoplastic material, such as vinyl plastisol, which comprises forming a valve with a base flange and an elongate body extending therefrom by deposit from vinyl plastisol, said valve having an axially extending bore extending into said elongate body through said base flange, slitting the closed end of the elongate body to form abutting sealing lips therein communicating with said bore, coating said sealing lips with silicone oil having a viscosity of about 60,000 centipoises, assembling the valve on the inner wall of a hollow inflatable article made from vinyl plastisol, and heating the article to fuse said base flange to the inner surface of the inflatable article, fusion of said sealing lips together being prevented by the silicone oil coating thereon.

References Cited in the file of this patent

UNITED STATES PATENTS

| | | |
|---|---|---|
| 2,183,900 | Voit et al. | Dec. 19, 1939 |
| 2,233,096 | Goldsmith | Feb. 25, 1941 |
| 2,477,899 | Rempel | Aug. 2, 1949 |
| 2,573,609 | Robinson | Oct. 30, 1951 |
| 2,700,980 | Andrews | Feb. 1, 1955 |
| 2,812,551 | Chupa | Nov. 12, 1957 |
| 2,830,610 | Chupa | Apr. 15, 1958 |
| 2,851,054 | Campbell | Sept. 9, 1958 |
| 2,935,320 | Chupa | May 3, 1960 |
| 2,945,693 | Way | July 19, 1960 |

FOREIGN PATENTS

| | | |
|---|---|---|
| 720,969 | Great Britain | Dec. 29, 1954 |